US006775340B1

(12) United States Patent
Arslan et al.

(10) Patent No.: US 6,775,340 B1
(45) Date of Patent: Aug. 10, 2004

(54) SYNCHRONIZATION AND CHANNEL ESTIMATION WITH EXTENDED PILOT SYMBOLS

(75) Inventors: Huseyin Arslan, Durham, NC (US); Rajaram Ramesh, Cary, NC (US); Gregory E. Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 730 days.

(21) Appl. No.: 09/687,500

(22) Filed: Oct. 13, 2000

(51) Int. Cl.$^7$ ................................................ H04L 7/00
(52) U.S. Cl. ..................................................... 375/354
(58) Field of Search ............................... 375/354, 347, 375/341, 316, 348, 346, 358

(56) References Cited

U.S. PATENT DOCUMENTS

| | | | | |
|---|---|---|---|---|
| 6,081,566 A | * | 6/2000 | Molnar et al. | 375/347 |
| 6,304,618 B1 | * | 10/2001 | Hafeez et al. | 375/341 |
| 6,370,205 B1 | * | 4/2002 | Lindoff et al. | 375/319 |

FOREIGN PATENT DOCUMENTS

| | | |
|---|---|---|
| EP | 0715440 A1 | 6/1996 |
| WO | WO 99/04537 A1 | 1/1999 |

OTHER PUBLICATIONS

H. Arslan et al., "Interpolation and channel tracking based receivers for coherent mary–PSK modulations," *Proc. IEEE Vehic. Technol. Conf.*, Houston, USA, May 17–19, 1999.

N. Seshadri, "Joint data and channel estimation using the fast blind trellis search techniques," *Proc. IEEE Globecom Conf.*, pp. 1659–1663, Dec. 1990.

J. Lin et al., "Joint data and channel estimation for TDMA mobile channels," *Proc. IEEE PIMRC Conf.*, pp. 235–239, 1992.

K. M. Chugg, "Acquisition performance of blind sequence detectors using psp," *Proc. IEEE Vehic. Technol. Conf.*, pp. 539–543, May 1997.

K. M. Chugg, "Blind acquisition characteristics of psp–based sequence detectors," *IEEE Journal on Selected Areas in Communications*, vol. 16, No. 8, pp. 1518–1527, Oct. 1998.

"Further Evaluation of the 'Simple' Transmit Diversity Scheme for the ANSI–136 AMR," *TDMA Wireless Systems Signal Processing Working Group, SBC Technology Resources Conf.*, Vancouver, BC, pp. 1–15, Mar. 27–29, 2000.

Hüseyin Arslan et al., *Interpolation and Channel Tracking Based Receivers for Coherent Mary–PSK Modulations*, Vehicular Technology Conference, May 1999, at 2194–2199.

Garrick T. Irvine & Peter J. McLane, *Symbol–Aided Plus Decision–Directed Reception for PSK/TCM Modulation on Shadowed Mobile Satellite Fading Channels*, IEEE Journal on Selected Areas in Communications, Oct. 1, 1992, at 1289–1299.

* cited by examiner

*Primary Examiner*—Khai Tran
(74) *Attorney, Agent, or Firm*—Wood, Phillips, VanSanten, Clark & Mortimer (57) ABSTRACT

A mobile communications system receiver has improved synchronization and channel estimation for receiving a transmitted signal passing through a radio channel. A processor receives and samples the transmitted signal for a plurality of timing hypotheses. A channel estimator hypothesizes unknown symbols at a pilot cluster of the sampled signal and estimates the radio channel of the pilot cluster for each hypothesized symbol sequence. The estimator determines an error corresponding to each hypothesized symbol sequence using the sampled signal, the estimated radio channel and the hypothesized symbols and determines actual timing estimates and actual radio channel estimates by selecting the radio channel estimates associated with the hypothesized symbols and the timing and hypothesis that minimizes the error.

25 Claims, 6 Drawing Sheets

| Sync | RSVD FPC | Data | Pilot | Data | Pilot | Data | Pilot | Data | Pilot | Ramp |
|------|----------|------|-------|------|-------|------|-------|------|-------|------|
| 14 | 1 | 34 | 3 | 33 | 3 | 33 | 3 | 33 | 3 | 2 |

SYNCHRONIZATION AND CHANNEL ESTIMATION WITH EXTENDED PILOT SYMBOLS

BACKGROUND OF THE INVENTION

The present invention relates to mobile communications systems and, more particularly, to improving synchronization and channel estimation with extended pilot symbols.

In certain mobile communications systems, such as those designed using the EIA-TIA-136 standard, also referred to as ANSI-136, a signal is transmitted in sequential timeslots. Each timeslot comprises a sequence of symbols. In ANSI-136, the slot format includes regularly spaced pilot symbols, in addition to a sequence of synchronization symbols, inserted between data symbols. This is done so that more precise fading compensation can be attained for coherent reception. Interpolation for channel estimation has been shown to outperform decision directed channel tracking based receivers in coherent modulation as discussed in H. Arslan, R. Ramesh, A. Mostafa, "Interpolation and Channel Tracking Based Receivers for Coherent Mary-PSK Modulations," Proc. IEEE Vehic. Technol. Conf., Houston, USA, May, 17–19 1999. However, channel interpolation requires use of many pilot symbols. This will increase the overhead, consequently reducing efficiency of the mobile communications system. While it is possible to reduce the number of pilot symbols, reduced pilot symbols degrade performance of timing and channel estimation.

Figure 1:
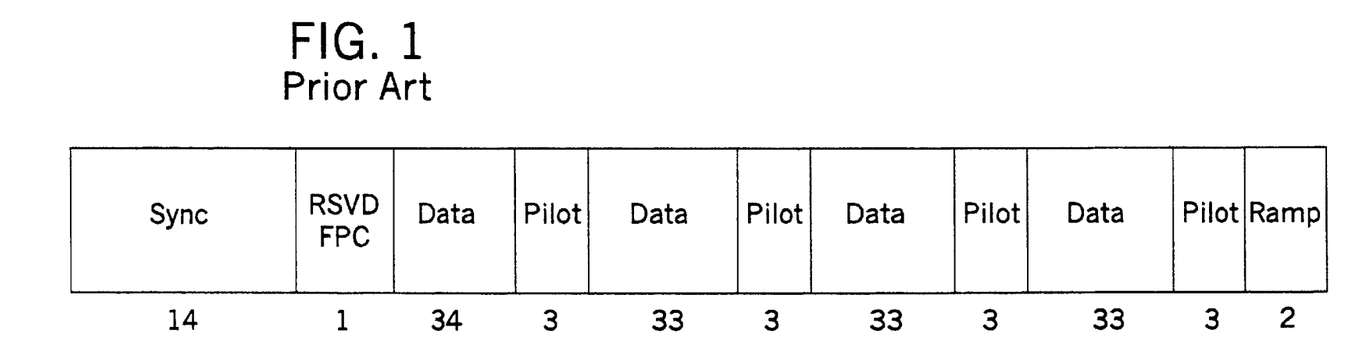
FIG. 1 illustrates a prior art downlink slot format.

Prior systems used sufficient number of pilot symbols for estimating flat fading channels in ANSI-136 systems. The timing is estimated by exploiting all of the available pilot symbols and the synchronization sequence. Channel estimates are obtained by least square estimation over the known pilot locations. These estimates are used to find the channel estimate values over the unknown fields via interpolation. It has been observed that three pilot symbols at each location were not enough to estimate frequency selective channels. As a result, current solutions are limited to non-dispersive channels. FIG. 1 shows the downlink slot format of a previously proposed ANSI-136 system. As is apparent, overhead is an issue, as the pilot symbols and synchronization symbols reduce the data throughput.

Alternatively, blind channel estimation, also known as self-recovering, approaches have been considered extensively to increase spectral efficiency. Blind channel estimation does not require transmission of known symbols. Among different versions of blind estimation approaches, more recently introduced joint channel and data estimation approaches have found interest in mobile communications systems. These approaches, which are optimal and require relatively few received signal samples for channel estimation, are based on the maximum likelihood criterion for jointly estimating the channel impulse response and the data sequence. However, computational complexity of the algorithms is high when the intersymbol interference (ISI) spans many symbols. The joint data and channel estimation algorithms fit least square channel estimates for every possible data sequence that could have been transmitted and corresponding to the received sequence. These applications then choose the data sequence and its channel fit that minimizes the least square's error. In practice, such algorithms are implemented recursively and non-exhaustively using generalized Viterbi algorithm and per-survivor processing (PSP). These approaches are described, for example, in N. Seshadri, "Joint Data and Channel Estimation Using the Fast Blind Trellis Search Techniques," Proc. IEEE Globecom Conf., pp. 1659–1663, December 1990; J. Lin, F. Ling, J. Proakis, "Joint Data and Channel Estimation for TDMA Mobile Channels," Proc. IEEE PIMRC Conf., pp. 235–239, 1992; and K. M. Chugg, "Acquisition Performance of Blind Sequence Detectors Using PSP," Proc. IEEE Vehic. Technol. Conf., vol. 2, pp. 539–543, May 1997. Basically, these algorithms maintain $K \geq 1$ best survivors into each state. Associated with each survivor a least square channel estimate is updated at every time instant. When $K=1$, it is simply the Viterbi algorithm with PSP.

SUMMARY OF THE INVENTION

The present invention provides improved synchronization and channel estimation with hypothesized pilot symbols.

Broadly, a receiver has improved synchronization and channel estimation for receiving a transmitted signal passing through a radio channel. A processor receives and samples the transmitted signal for a plurality of timing hypotheses. A channel estimator hypothesizes unknown pilot symbols at a pilot cluster of the sampled signal and estimates the radio channel of the pilot cluster for each hypothesized pilot symbol. The estimator determines an error corresponding to each hypothesized pilot symbol using the sampled signal, the estimated radio channel and the hypothesized pilot symbols and determines actual timing estimates and actual radio channel estimates by selecting the radio channel estimates associated with the hypothesized pilot symbols and the timing and hypothesis that minimizes the error.

Further features and advantages of the invention will be readily apparent from the specification and the drawings.

DETAILED DESCRIPTION OF THE INVENTION

Figure 2:
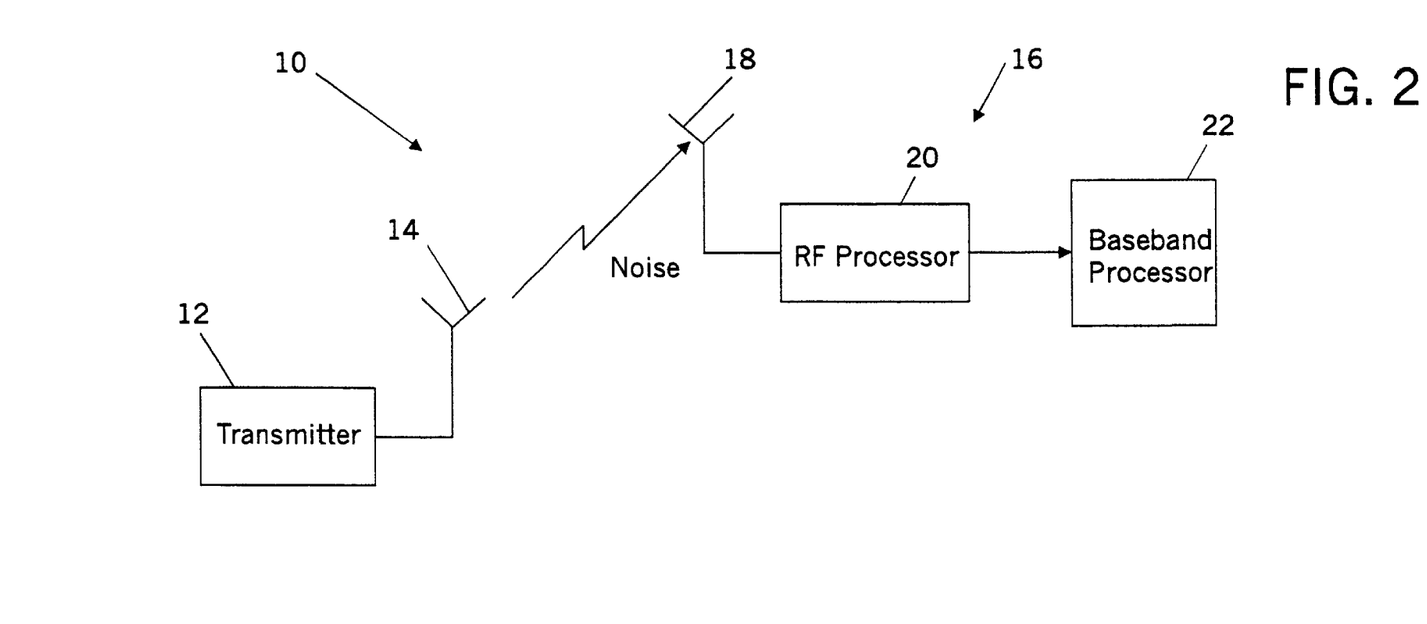
FIG. 2 is a block diagram of a mobile communications system including improved synchronization and channel estimation with extended pilot symbols in accordance with the invention.

Referring to FIG. 2, a block diagram illustrates a mobile communications system 10, such as an ANSI-136 system, using improved synchronization and channel estimation with extended pilot symbols in accordance with the invention. The mobile communications system 10 improves the timing and channel estimation process so that a lower number of the pilot symbols can be used in a time-division multiple access (TDMA) slot. This process can also be used effectively to handle dispersive channels.

The mobile communications system 10 includes a transmitter 12 that transmits an information signal via an antenna 14. The information signal is modulated at a carrier frequency specified by the system and regulatory agencies and suitable for radio communication. The transmitted signal reaches a radio receiver 16 having an antenna 18 after passing through a propagation medium (for example, a mobile radio channel). The transmitted signal plus thermal noise and interference are received at the receiver antenna 18. The received signal is processed by a radio frequency (RF) processor 20 to produce a baseband signal corresponding to the desired carrier frequency. Specifically, the RF processor 20 amplifies, mixes, filters, samples and quantizes the signal to extract the baseband signal corresponding to the desired carrier frequency. The resulting baseband signal is provided to a baseband processor 22 for demodulation of the transmitted information signal.

Figure 9:
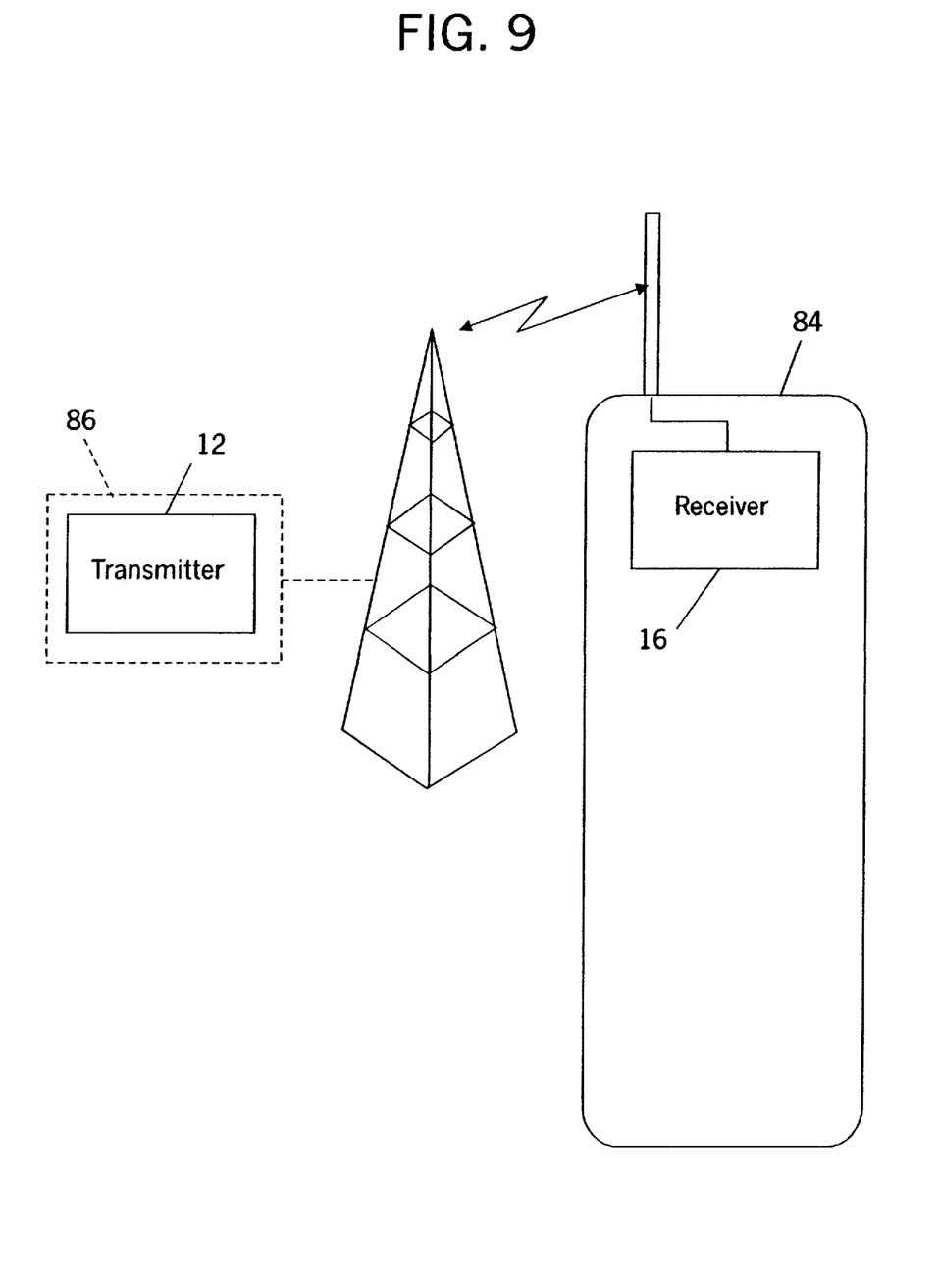
FIG. 9 is a generalized illustration of a mobile communications system including a base station and a mobile terminal in accordance with the invention.

In the illustrated embodiment of the invention, the receiver 16 is described as the receiver of a mobile terminal 84, see FIG. 9, while the transmitter 12 is associated with a base station 86, see FIG. 9, as part of a fixed terminal. Alternatively, the receiver 16 could be the receiver in a base station, while the transmitter 12 could be the transmitter in mobile terminals, or any combination thereof.

The present invention is described herein in the context of a mobile terminal. As used herein, the term "mobile terminal" may include a mobile communications radiotelephone with or without a multi-line display; a Personal Communications System (PCS) terminal that may combine a mobile communications radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Figure 3:
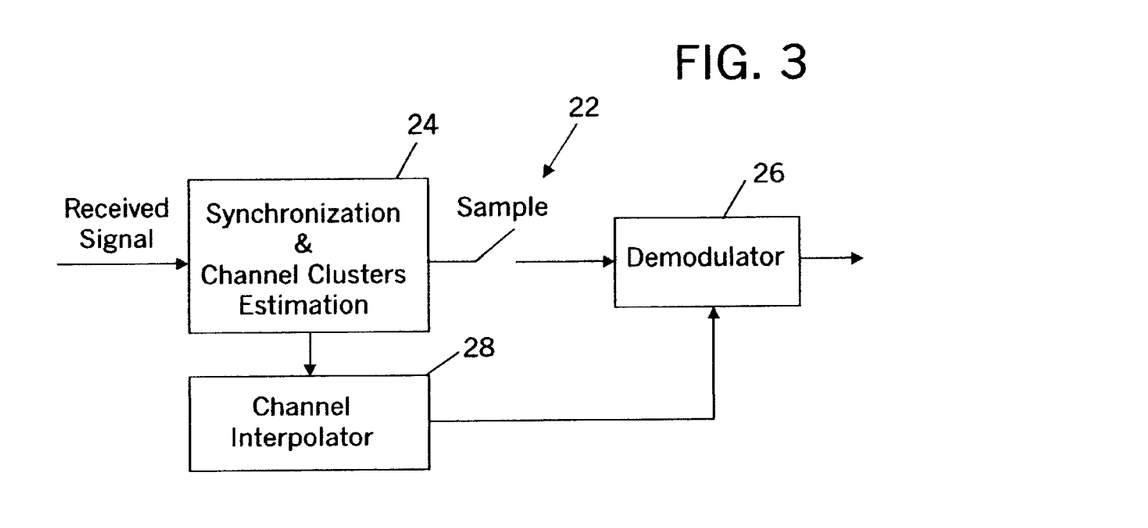
FIG. 3 is a block diagram of the baseband processor of FIG. 2.

Referring to FIG. 3, the baseband processor 22 is illustrated in greater detail. The received signal is supplied to a synchronization and channel clusters estimation block 24. Its output is down-sampled and supplied to a demodulator 26. The block 24 is also connected to a channel interpolator 28 which is in turn connected to the demodulator 26. Synchronization and estimation of channel clusters, using extended pilot symbols, are done prior to the demodulation process. The synchronization and channel clusters estimation block 24 does not estimate the channel over the whole slot. Instead, the channels are estimated in small clusters around the known pilot symbols. Using the channel estimates over the small clusters, channel estimation over the whole slot is performed via interpolation using the channel interpolator 28. The channel estimates over the whole slot and the down-sampled baseband samples are used to demodulate the unknown data.

Figure 4:
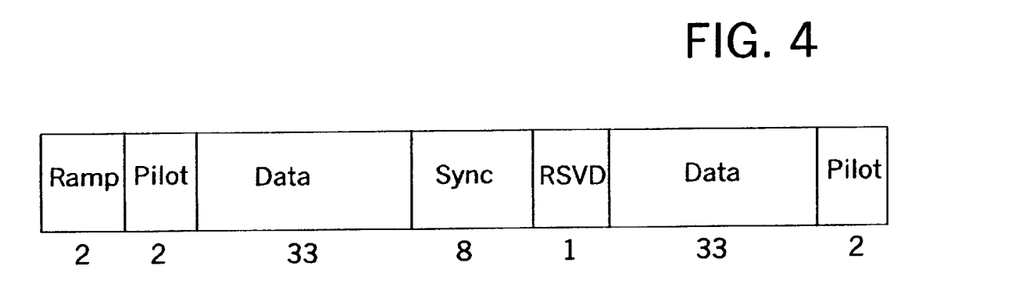
FIG. 4 illustrates format of a proposed downlink slot format.
Figure 5:
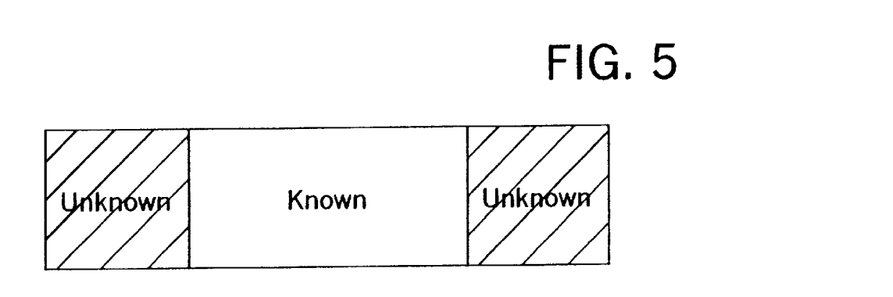
FIG. 5 illustrates a portion of the format of FIG. 4 illustrating extending the number of pilot symbols adjacent to known pilot symbols in accordance with the invention.

The present invention is not specific to any particular type of slot structure. Instead, the invention allows systems to reduce the number of known symbols being transmitted. A representative slot structure proposed for ANSI-136 systems is shown in FIG. 4. As can be seen in this format, the number of pilot symbols at each pilot location and the number of synchronization symbols is reduced compared to the format shown in FIG. 1. In accordance with the invention, the number of pilot symbols is extended by hypothesizing the information symbols adjacent to the known pilot symbol, as shown in FIG. 5. Depending on the locations of data symbols, the hypothetical symbols are before, after, or on both sides of the known symbols. Synchronization and channel estimation are performed for each hypothesis. Accordingly, error corresponding to each hypothesis is found. This error term is minimized based upon the joint hypothesis of the symbols and the timing.

As an example, assume that there are K possible timing hypotheses, where K=1 . . . k, . . . K. In other words, the fine sync window size is K. Also, assume that there are L pilot locations or clusters. It is not necessary to assume equal number of pilot symbols at each pilot cluster. Also, it is not necessary to extend the pilot symbols at each pilot cluster.

In the slot structure shown in FIG. 4, L=3. The first and third pilot clusters have two symbols, P(1)=2 and P(3)=2. The second pilot location, namely the sync word, has eight (8) symbols, so that P(2)=8. In this example, the number of pilot symbols have been extended or hypothesized for the first and third pilot clusters from two symbols to four symbols. This enables the system to provide better channel estimates at those locations and better overall timing estimates. For 8-PSK (phase-shift keying) signaling, each addition of a pilot symbol requires a factor of 8 hypotheses.

Initially, for each timing hypothesis, the received signal is sampled to obtain the received samples $r_k(n)$. The channel estimates are found at each pilot cluster. The channel estimates are found using, for example, the least square method. In accordance with one aspect of the invention, the channel estimates are found for each pilot cluster separately. For the second pilot cluster, P(2), the system does regular least square estimating without extending the pilot symbols, estimates the channel, and uses the received signal, estimated channel and known symbols to find the error locally at this location, $\hat{e}_2$. Next, for the first cluster P(1), the system extends the number of pilot symbols to four (4) symbols, i. e., two known symbols and a sequence of two hypothesized unknown symbols, resulting in $8^2$ hypotheses. For each sequence hypothesis the corresponding channel estimates and the error terms are found locally at this pilot location, $\tilde{e}_1(S_H(1),S_H(2))$. The hypothesis that minimizes the error gives the estimated symbols, the corresponding channel estimates, and the minimum local error as follows:

$$\hat{e}_1 = \arg\min_{S_H(1),S_H(2)} \tilde{e}_1(S_H(1), S_H(2)). \qquad (1)$$

The same process is repeated for the third pilot location P(3), and the minimum error is found similarly, as follows:

$$\hat{e}_3 = \arg\min_{S_H(3),S_H(4)} \tilde{e}_3(S_H(3), S_H(4)). \qquad (2)$$

Note that overall, there is a sequence of four unknown symbols, a sequence of two symbols associated with the first pilot cluster and sequence of two symbols associated with the third pilot cluster.

Then, the total error (the sum of minimum errors over each pilot cluster), is obtained by summing the errors as follows:

$$e(k)=\hat{e}_1+\hat{e}_2+\hat{e}_3 \qquad (3)$$

Figure 6:
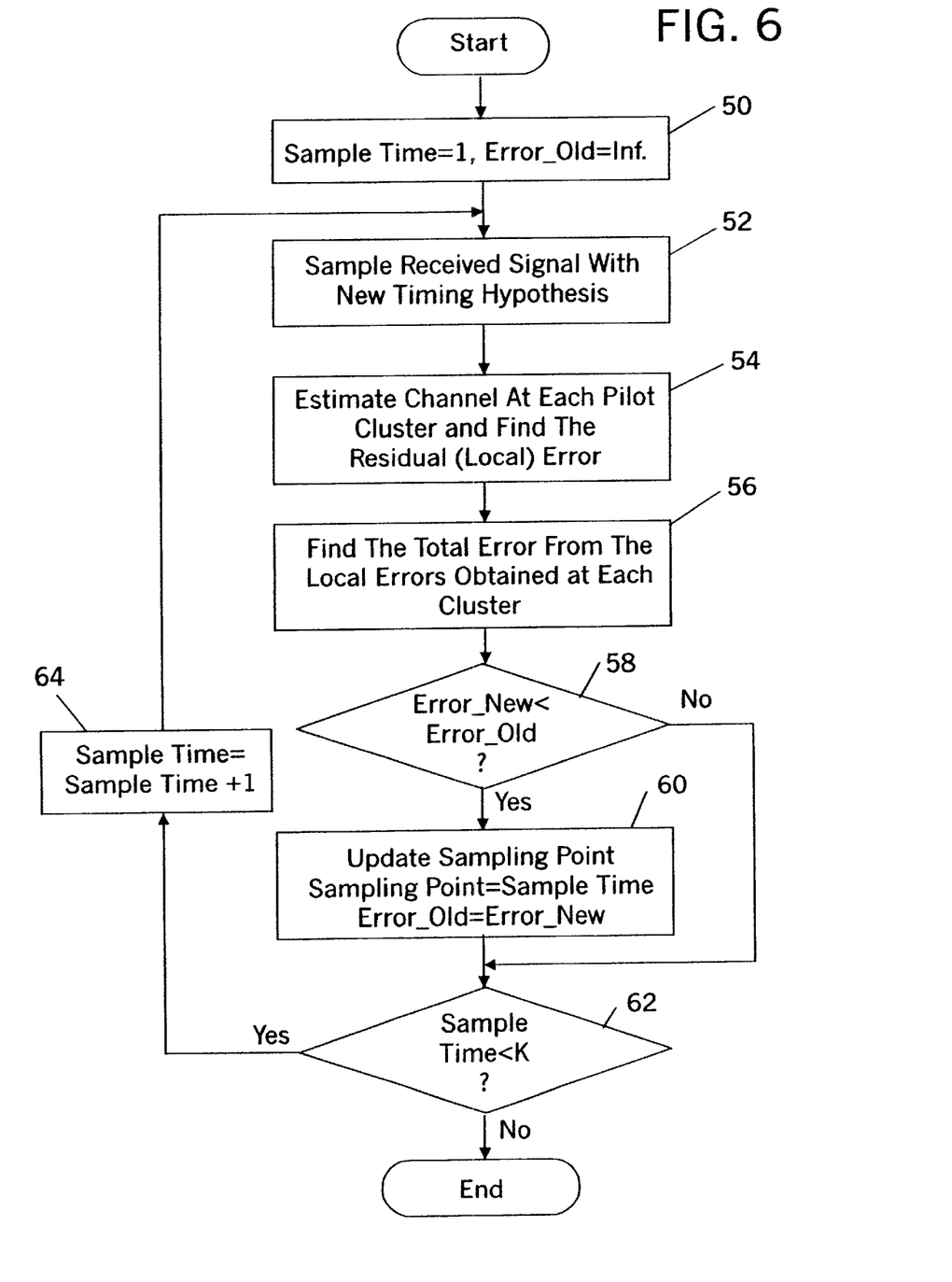
FIG. 6 is a flow diagram illustrating a program implemented in the baseband processor of FIG. 2 in accordance with one aspect of the invention.

This error term corresponds to the kth sample timing, e(k). For each sampling timing the error terms are calculated. The sampling timing that minimizes the total error gives the timing estimates, and the corresponding symbol estimates and the corresponding channel estimates. A flow chart summarizing the joint sync and channel clusters estimation based on this approach is shown in FIG. 6.

The process begins at a start node and proceeds to a block 50 that sets a sample time value to one and an "error_old" value to infinity. The received signal is sampled with a new timing hypothesis at a block 52. The channel is estimated at each pilot cluster at a block 54 and the residual or local error is also found. The residual errors from each cluster are summed at a block 56 to find a total error value. A decision block 58 determines if the total error value, labeled "error_new", is less than "error_old". If so, then the sampling point is updated by setting a sample point value to sample time and setting "error_old" to the value of "error_new" at a block 60. If not, or after updating the sampling point, a decision block 62 determines if the sample time is less than K. If not, indicating that all sampling timings have been evaluated, then the process ends. Otherwise, the sample time is incremented at a block 64 and the process returns to the block 52 to perform estimation for the next sampling timing. Thus, this process continues until finding the sampling timing that minimizes the error to give the timing estimates and thus also finding the channel estimates.

In accordance with another aspect of the invention, the channel estimates are calculated jointly for each timing hypothesis. This provides optimal channel estimates at the expense of computational complexity. In the example discussed above, a number of hypotheses for each sample timing is $8^4$. For each joint symbol sequence hypothesis, the channel estimates at all of the pilot clusters are calculated using a Wiener interpolation. The error corresponding to all sequence hypotheses is calculated from the received signal, channel estimates and hypothesized symbols and is represented by $\hat{e}(S_H(1),S_H(2),S_H(3),S_H(4))$.

The hypothesis that minimizes the error gives the estimated symbols and corresponding channel estimates as follows:

$$e(k) = \arg\min_{S_H(1),S_H(2),S_H(3),S_H(4)} e(S_H(1), S_H(2), S_H(3), S_H(4)). \quad (4)$$

Figure 7:
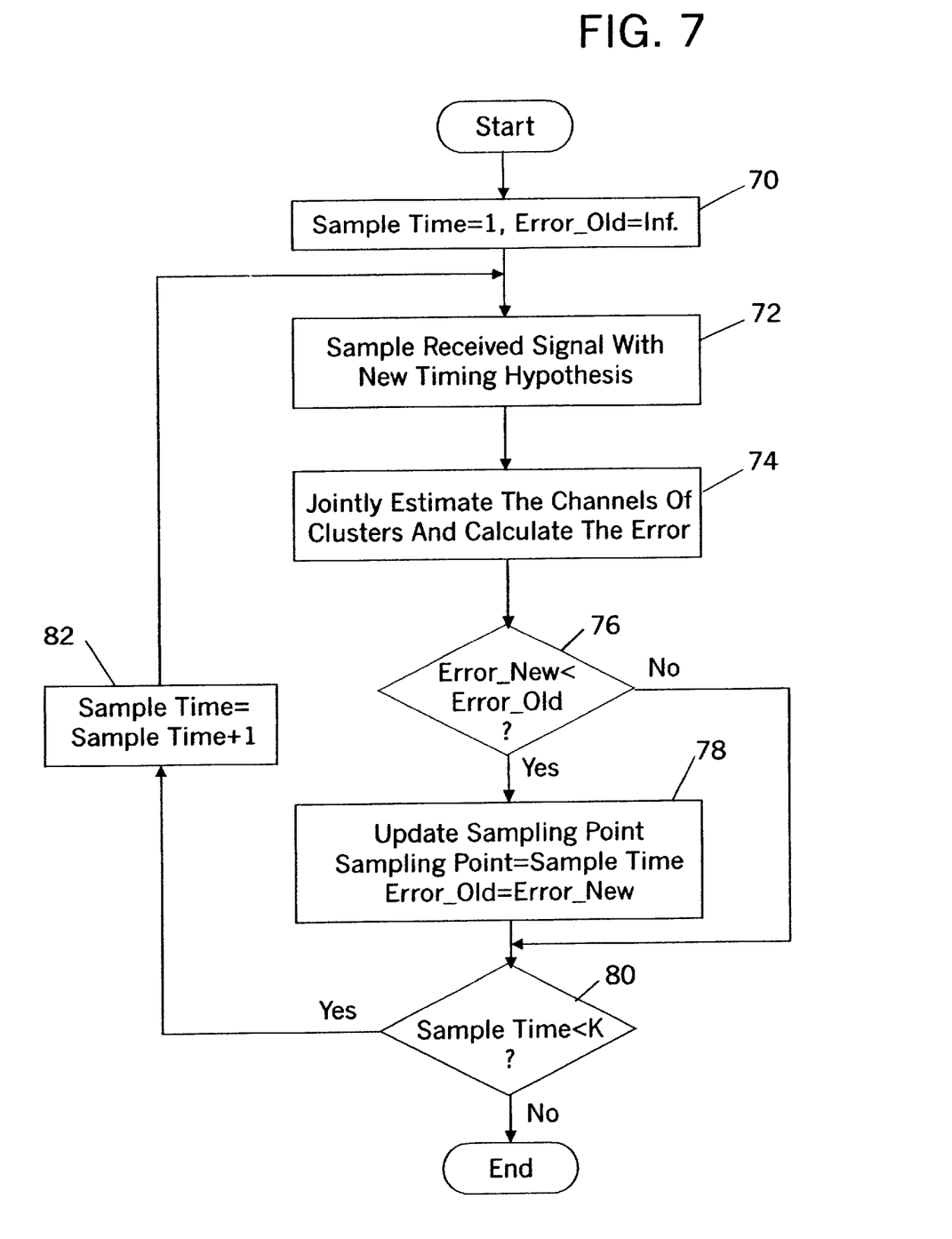
FIG. 7 is a flow diagram illustrating a program implemented in the baseband processor of FIG. 2 in accordance with another aspect of the invention.

A flow chart illustrating the joint synchronization and channel clusters estimation based on this aspect is shown in FIG. 7.

The process begins at a start node and proceeds to a block 70 that sets a sample time value to one and an "error_old" value to infinity. The received signal is sampled with a new timing hypothesis at a block 72. The channel is jointly estimated at a block 74 and the error is also found. A decision block 76 determines if the new error value, labeled "error_new", is less than "error_old". If so, then the sampling point is updated by setting a sample point value to sample time and setting "error_old" to the value of "error_new" at a block 78. If not, or after updating the sampling point, a decision block 80 determines if the sample time is less than K. If not, indicating that all sampling timings have been evaluated, then the process ends. Otherwise, the sample time is incremented at a block 82 and the process returns to the block 72 to perform estimation for the next sampling timing. Thus, this process continues until finding the sampling timing that minimizes the error to give the timing estimates and thus also finding the channel estimates.

Figure 8A:
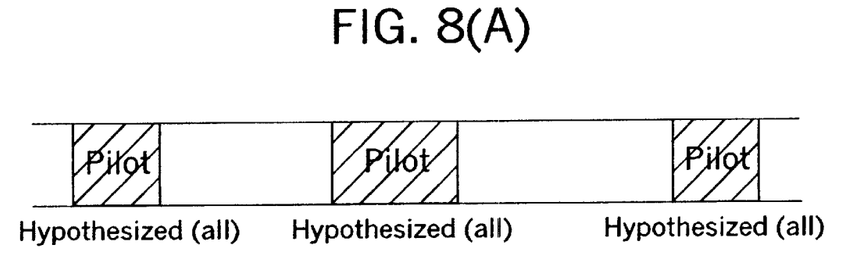
FIGS. 8(A)–8(C) illustrate different combinations of downlink slot format in accordance with the invention.
Figure 8B:
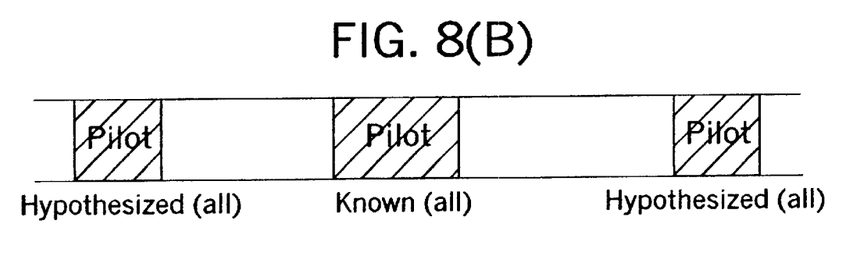
Figure 8C:
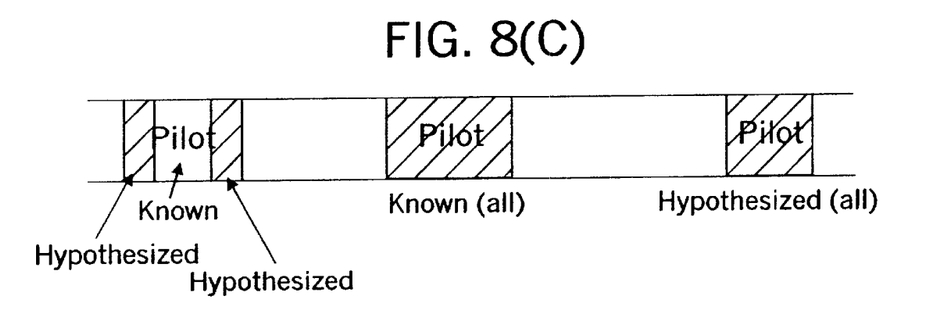

The above described examples extend pilot clusters by hypothesizing unknown symbols around known pilot symbols. Reducing the number of pilot symbols within a cluster, or the number of clusters, reduces the overhead and increases spectral efficiency, but reduces channel estimation accuracy. The described approach maintains channel estimation accuracy with the reduced overhead. The described approach can be generalized further by reducing the overhead further and increasing the number of hypothesized symbols. In an extreme example, a scheme can be implemented that does not require any known pilot symbols within a cluster. Instead, all the pilot symbols within the cluster are hypothesized. As examples, in FIG. 8(A) all of the clusters are formed from totally unknown symbols. In FIG. 8(B) some of the clusters are formed from totally known pilot symbols and some of the clusters are formed from totally unknown symbols. In FIG. 8(C), some of the clusters are formed from totally known pilot symbols, some of the clusters are formed from totally unknown symbols and some of the clusters are formed from partially known and partially unknown symbols.

While the above described examples are for timing and channel coefficient estimation, the present invention may be applied to timing or channel estimation separately. For example, timing may be determined without hypothesizing symbols, whereas channel estimation uses hypothesized symbols.

In the above described examples, the final or actual channel estimates are determined from one particular hypothesized symbol sequence. When there is a large amount of noise, the particular hypothesized symbol sequence may not correspond to the true sequence. To account for this, the overall channel estimates can be formed using a weighted sum of multiple channel estimates, corresponding to different hypothesized symbol sequences. The sum should be weighted by the likelihood that the hypothesized sequences were sent, given the received data. Instead of using a weighted sum of all possible sequence results, the best K sequence results can be used.

In the above described examples, the locations of the unknown symbols were arbitrary. These locations can also be selected adaptively, based on which locations yield a smaller error or based on which locations give detected symbol values with large confidence.

While the present invention has been described with respect to a TDMA system, the present invention is also applicable to other systems, such as the Wideband Code-Division Multiple Access (WCDMA) system, which also employs pilot symbol clusters.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

Thus, in accordance with the invention there is provided a method and apparatus for improving synchronization and channel estimation with extended pilot symbols.

We claim:

1. A method of performing synchronization and channel estimation for a transmitted signal passing through a radio channel comprising:
   receiving and sampling the transmitted signal for a plurality of timing hypotheses;
   for each of said timing hypotheses, hypothesizing unknown symbols at a pilot cluster of the sampled signal;
   estimating the radio channel at the pilot cluster for each cluster's hypothesized unknown symbol sequence;
   determining an error corresponding to each hypothesized unknown symbol sequence using the sampled signal, the estimated radio channel and the hypothesized symbols; and
   determining actual timing estimates and actual radio channel estimates by selecting the radio channel estimates associated with the hypothesized unknown symbols and the timing hypothesis that minimizes the error.

2. The method of claim 1 wherein the unknown symbols are hypothesized at a plurality of pilot clusters.

3. The method of claim 2 wherein estimating the radio channel at the pilot cluster for each cluster's hypothesized unknown symbol sequence comprises finding radio channel estimates separately at each pilot cluster.

4. The method of claim 3 wherein determining actual timing estimates and radio channel estimates comprises selecting a minimum error for each of the pilot clusters for each timing hypothesis, summing the minimum error for each timing hypothesis and selecting a minimum error of the summed errors.

5. The method of claim 3 wherein estimating the radio channel at the pilot cluster for each cluster's hypothesized unknown symbol sequence comprises finding radio channel estimates jointly for all of the pilot clusters.

6. The method of claim 5 wherein determining actual timing estimates and radio channel estimates comprises selecting the timing hypothesis that minimizes the error for the joint channel estimates.

7. A method of performing channel estimation for a transmitted signal passing through a radio channel, the transmitted signal comprising a sequence of symbols having a plurality of clusters of known pilot symbols, the method comprising:
   receiving and sampling the transmitted signal;
   hypothesizing unknown symbols for at least one of the pilot clusters of the sampled signal;
   estimating the radio channel at the pilot clusters for each cluster's hypothesized unknown symbol sequence;
   determining an error corresponding to each hypothesized unknown symbol sequence using the sampled signal, the estimated radio channel and the hypothesized unknown symbols; and
   determining actual radio channel estimates by selecting the radio channel estimates associated with the hypothesized unknown symbols that minimizes the error.

8. A method of performing synchronization and channel estimation for a transmitted signal passing through a radio channel, the transmitted signal comprising a sequence of symbols having a plurality of clusters of known pilot symbols, the method comprising:
   receiving and sampling the transmitted signal for a plurality of timing hypotheses;
   for each of said timing hypotheses, hypothesizing unknown symbols for at least one of the pilot clusters of the sampled signal;
   estimating the radio channel at the pilot clusters for each cluster's hypothesized unknown symbol sequence;
   determining an error corresponding to each hypothesized unknown symbol sequence using the sampled signal, the estimated radio channel and the hypothesized unknown pilot symbols; and
   determining actual timing estimates and actual radio channel estimates by selecting the radio channel estimates associated with the hypothesized unknown symbols and the timing hypothesis that minimizes the error.

9. The method of claim 8 wherein estimating the radio channel at the pilot cluster for each cluster's hypothesized unknown symbol sequence comprises finding radio channel estimates separately at each pilot cluster.

10. The method of claim 9 wherein determining actual timing estimates and radio channel estimates comprises selecting a minimum error for each of the pilot clusters for each timing hypothesis, summing the minimum errors for each timing hypotheses and selecting a minimum error of the summed errors.

11. The method of claim 8 wherein estimating the radio channel at the pilot cluster for each cluster's hypothesized unknown symbol sequence comprises finding radio channel estimates jointly for all of the pilot clusters.

12. The method of claim 11 wherein determining actual timing estimates and radio channel estimates comprises selecting the timing hypothesis that minimizes the error for the joint channel estimates.

13. The method of claim 8 wherein the transmitted signal comprises a time-division multiple access transmitted signal having timeslots, each timeslot having the plurality of pilot clusters.

14. The method of claim 13 wherein hypothesized unknown symbols are added to only select ones of the plurality of pilot clusters.

15. The method of claim 13 wherein select ones of the plurality of pilot clusters consist solely of hypothesized unknown symbols.

16. The method of claim 8 wherein estimating the radio channel at the pilot clusters for each cluster's hypothesized unknown symbol sequence comprises calculating estimates using least square channel estimation.

17. A receiver having improved synchronization and channel estimation for receiving a transmitted signal passing through a radio channel, the receiver comprising:
   a processor receiving and sampling the transmitted signal for a plurality of timing hypotheses, the transmitted signal comprising a sequence of symbols having a plurality of clusters of known pilot symbols; and
   a channel estimator hypothesizing unknown pilot symbols for at least one of the pilot clusters of the sampled signal for each of said timing hypotheses, estimating the radio channel at the pilot clusters and calculating an error for each of their hypothesized unknown symbol sequences, and determining actual timing estimates and actual radio channel estimates by selecting the radio channel estimates associated with the hypothesized unknown symbols and the timing hypothesis that minimizes the error.

18. The receiver of claim 17 wherein the channel estimator estimates the radio channel at the pilot cluster for each cluster's hypothesized unknown symbol sequence by finding radio channel estimates separately at each pilot cluster.

19. The receiver of claim 17 wherein the channel estimator estimates the radio channel at the pilot cluster for each cluster's hypothesized unknown symbol sequence by finding radio channel estimates jointly for all of the pilot clusters.

20. A mobile terminal used in a mobile communications system and having improved synchronization and channel estimation, comprising:
- a receiver for receiving a transmitted signal passing through a radio channel;
- a processor receiving and sampling the transmitted signal for a plurality of timing hypotheses, the transmitted signal comprising a sequence of symbols having a plurality of clusters of known pilot symbols; and
- a channel estimator hypothesizing unknown symbols for at least one of the pilot clusters of the sampled signal for each of said timing hypotheses, estimating the radio channel at the pilot clusters and calculating an error for each of their hypothesized unknown symbol sequences, and determining actual timing estimates and actual radio channel estimates by selecting the radio channel estimates associated with the hypothesized unknown symbols and the timing hypothesis that minimizes the error.

21. The mobile terminal of claim 20 wherein the channel estimator estimates the radio channel at the pilot cluster for each cluster's hypothesized unknown symbol sequence by finding radio channel estimates separately at each pilot cluster.

22. The mobile terminal of claim 20 wherein the channel estimator estimates the radio channel at the pilot cluster for each cluster's hypothesized unknown symbol sequence by finding radio channel estimates jointly for all of the pilot clusters.

23. A base station used in a mobile communications system and having improved synchronization and channel estimation, comprising:
- a receiver for receiving a transmitted signal passing through a radio channel;
- a processor receiving and sampling the transmitted signal for a plurality of timing hypotheses, the transmitted signal comprising a sequence of symbols having a plurality of clusters of known pilot symbols; and
- a channel estimator hypothesizing unknown symbols for at least one of the pilot clusters of the sampled signal for each of said timing hypotheses, estimating the radio channel at the pilot clusters and calculating an error for each of their hypothesized unknown symbol sequences, and determining actual timing estimates and actual radio channel estimates by selecting the radio channel estimates associated with the hypothesized unknown symbols and the timing hypothesis that minimizes the error.

24. The base station of claim 23 wherein the channel estimator estimates the radio channel at the pilot cluster for each cluster's hypothesized unknown symbol sequence by finding radio channel estimates separately at each pilot cluster.

25. The base station of claim 23 wherein the channel estimator estimates the radio channel at the pilot cluster for each cluster's hypothesized unknown symbol sequence by finding radio channel estimates jointly for all of the pilot clusters.

* * * * *